United States Patent

Bansal et al.

Patent Number: 5,256,610
Date of Patent: Oct. 26, 1993

[54] SINTERING SILICON NITRIDE

[75] Inventors: Narottam P. Bansal, North Olmsted; Stanley R. Levine, Rocky River; William A. Sanders, Westlake, all of Ohio

[73] Assignee: The United States of America as represented by the Administrator of the National Aeronautics and Space Administration, Washington, D.C.

[21] Appl. No.: 982,535

[22] Filed: Nov. 27, 1992

[51] Int. Cl.$^5$ .................................. C04B 35/58
[52] U.S. Cl. ................................ 501/97; 501/96
[58] Field of Search ............................ 501/96, 97

[56] References Cited

U.S. PATENT DOCUMENTS

| | | | |
|---|---|---|---|
| 3,836,374 | 9/1974 | Richerson et al. | 501/97 |
| 4,677,443 | 1/1987 | Koetje et al. | 343/872 |
| 4,719,187 | 1/1988 | Bardhan et al. | 501/97 |
| 4,870,036 | 9/1989 | Yeh | 501/97 |
| 4,919,868 | 4/1990 | Huang | 264/65 |
| 5,004,709 | 4/1991 | Stranford et al. | 501/97 |
| 5,100,847 | 3/1992 | Li et al. | 501/97 |
| 5,110,768 | 5/1992 | Kaner et al. | 501/1 |

Primary Examiner—Mark L. Bell
Assistant Examiner—Chris Gallo
Attorney, Agent, or Firm—Gene E. Shook; Guy M. Miller; James A. Mackin

[57] ABSTRACT

Oxides having a composition of $(Ba_{1-x}Sr_x)O$—$Al_2O_3$—$2SiO_2$ are used as sintering aids for producing an improved silicon nitride ceramic material. The x must be greater than 0 to insure the formation of the stable monoclinic celsian glass phase.

14 Claims, 1 Drawing Sheet

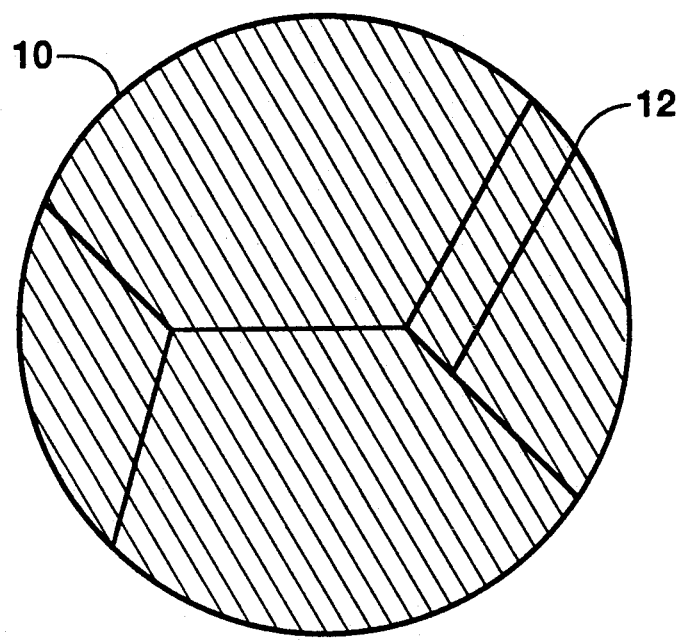

SINTERING SILICON NITRIDE

ORIGIN OF THE INVENTION

The invention described herein was made by employees of the U.S. Government together with a contractor employee performing work under a NASA contract and is subject to the provisions of Section 305 of the National Aeronautics and Space Act of 1958, Public Law 85-568 (72 Statute 435; 42 USC 2457).

TECHNICAL FIELD

This invention is concerned with sintering silicon nitride ($Si_3N_4$). The invention is particularly directed to improved sintering aids for use with this material.

Silicon nitride is a structural ceramic material with potential applications in aerospace propulsion and power systems. Various oxides, such as $Y_2O_3$, $Al_2O_3$, $MgO$, $Sc_2O_3$, and $CeO_2$, have been used as sintering aids for the densification of silicon nitride. The sintering of this material is carried out for two to four hours at temperatures exceeding 2100° C. in the presence of these oxides.

Certain serious problems have been encountered when using these oxides as sintering aids. One such problem is these oxides form glassy grain boundaries in the sintered silicon nitride material. It is nearly impossible to fully crystallize the glass present within the grain boundaries of the sintered silicon nitride material. The crystallization problem was encountered even after a long term annealing at high temperatures. This results in undesired degradation of high temperature mechanical properties, such as strength and creep, of the $Si_3N_4$.

It is, therefore, an object of the present invention to form a long lasting, durable silicon nitride ceramic material.

A further object of the invention is to provide an improved sintering aid for this ceramic material.

BACKGROUND ART

U.S. Pat. No. 4,677,433 to Koetje et al is directed to a radome for use in high temperature applications. The patent discusses prior art silicon nitride ceramic materials and their disadvantages which are attributed to the selected oxide used in their manufacture. These problems include the strength of the material and electrical characteristic inconsistencies. Barium-aluminum silicate is used in combination with silicon nitride to produce a ceramic material having uniform thermal characteristics.

U.S. Pat. No. 4,719,187 to Bardhan et al is concerned with sintering aids for silicon nitride, and the patent is directed to methods of achieving various very dense ceramics. The sintering aid is a fluoride composed of a mixture of aluminum, barium, calcium, strontium, and yttrium rare earth metals. The patent states that a mixture of any or all of these rare earth metals permits high density ceramics to be produced at a temperature much less than previously needed using prior art materials.

U.S. Pat. Nos. 4,919,868 to Huang, 5,004,709 to Stranford et al, and 5,110,768 to Kaner et al discuss various types of sintering aids used in the prior art.

DISCLOSURE OF THE INVENTION

In order to achieve the foregoing and other objects, in accordance with the purpose of the present invention as described herein, oxides having the composition of $(Ba_{1-x}Sr_x)O$—$Al_2O_3$—$2SiO_2$, where x is greater than 0 and up to 1, are used as sintering aids. There are many advantages of using these new oxides as compared to the sintering aids presently being used.

By way of example, the sintering temperature can be lowered from the aforementioned 2100° C. by as much as 300° C. to 400° C. to a temperature slightly above the melting point of the oxides. On cooling after this sintering, these oxides are fully crystallized, and do not form any glassy grain boundaries in the $Si_3N_4$.

These oxide compositions are quite refractory. This results in improved mechanical properties of the $Si_3N_4$ ceramic material, particularly at elevated temperatures.

BRIEF DESCRIPTION OF THE DRAWINGS

The accompanying drawing illustrates several aspects of the present invention, and together with the description, serves to explain the principles of the present invention. The drawing represents an enlarged section view of a silicon nitride ceramic material sintered in accordance with the present invention.

BEST MODE FOR CARRYING OUT THE INVENTION

A silicon nitride structural ceramic material is produced in accordance with the present invention by using oxides of the composition $(Ba_{1-x}Sr_x)O$—$Al_2O_3$—$2SiO_2$ as sintering aids in processing $Si_3N_4$. These oxides are added to the silicon nitride which is sintered in the range between 1700° C. and 1850° C. This temperature range is slightly above the melting point of the oxides in the sintering aids.

The sintered silicon nitride is cooled to room temperature and the oxide sintering aids are fully crystallized; therefore, they do not form any glassy grain boundaries in the $Si_3N_4$ shown as 10 in the drawing. The crystalline celsian grain boundary phase is shown at 12. These oxide compositions are quite refractory. This produces improved mechanical properties in the $Si_3N_4$, particularly at elevated temperatures.

As stated above, x must be greater than 0. Using a $(Ba_{1-x}Sr_x)O$—$Al_2O_3$—$2SiO_2$ composition with x=0 problems of microcracking on thermal cycling have been encountered. These problems are caused by the formation of a metastable hexacelsian phase which has a high thermal expansion of about $8.0 \times 10^{-6}/°$ C. This phase undergoes a reversible phase transformation at about 300° C. which is accompanied by a large volume change of about 3%. Therefore, the SrO doped compositions have a value of x between about 0.05 and 1.0.

The presence of the SrO stabilizes the formation of the stable monoclinic celsian phase. This phase has a low thermal expansion of about $2.3 \times 10^{-6}/°$ C., and shows no phase transformation.

Silicon nitride sintered with these new oxides as sintering aids produces a superior structural material showing high mechanical strength at elevated temperatures. The material having monoclinic celsian phase in the grain boundaries 12 is useful in radomes and other electronic applications. This is because the material has a low dielectric constant, low dielectric loss, and high mechanical strength.

While the preferred embodiment of the invention has been disclosed and described, it will be apparent that various structural and procedural modifications may be made to the invention without departing from the spirit thereof or the scope of the subjoined claims.

We claim:

1. In a silicon nitride structural ceramic material of the type that is sintered at a reduced temperature below about 2100° C., the improvement comprising
   a plurality of oxides for aiding said sintering at said reduced temperature, and
   SrO for stabilizing the formation of a stable monoclinic celsian phase in the grain boundaries.

2. A ceramic material as claimed in claim 1 including oxides of barium, aluminum, and silicon in the silicon nitride to reduce the sintering temperature.

3. A ceramic material as claimed in claim 2 comprising $Si_3N_4$ containing $(Ba_{1-x} Sr_x)O—Al_2O_3—2SiO_2$ where x is greater than 0.

4. A ceramic material as claimed in claim 3 comprising $Si_3N_4$ containing $(Ba_{1-x} Sr_x)O—Al_2O_3—2SiO_2$ where x is between about 0.05 and about 1.0.

5. A sintered structural composition of matter comprising
   a $Si_3N_4$ ceramic material, and
   a plurality of fully crystallized oxides, containing Sr, in said $Si_3N_4$ for lowering the sintering temperature, said crystallized oxides forming no glassy grain boundaries in the $Si_3N_4$.

6. A composition of matter as claimed in claim 5 comprising $Si_3N_4$ containing oxides of barium, aluminum, and silicon for lowering the sintering temperature.

7. A composition of matter as claimed in claim 6 including SrO for stabilizing the formation of a stable monoclinic celsian phase having a low thermal expansion.

8. A composition of matter as claimed in claim 7 wherein the stable monoclinic celsian phase has a thermal expansion of about $2.3 \times 10^{-6}/°$ C. so that no phase transformation is present.

9. A composition of matter as claimed in claim 7 including $(Ba_{1-x} Sr_x)O—Al_2O_3—2SiO_2$, where x is greater than 0.

10. A method of improving high temperature mechanical properties of silicon nitride comprising
    (a) adding oxides of barium, aluminum, and silicon to $Si_3N_4$ to lower the sintering temperature,
    (b) adding SrO to the $Si_3N_4$-oxide composition of (a) to stabilize the formation of a stable monoclinic phase during sintering,
    (c) sintering the composition of (b) at a temperature slightly above the melting temperature of the oxides, and
    (d) cooling the sintered material to room temperature whereby the oxides are fully crystallized with no glassy grain boundaries.

11. A method as claimed in claim 10 wherein $(Ba_{1-x} Sr_x)O—Al_2O_3—2SiO_2$ is added to the $Si_3N_4$ as a sintering aid where x is greater than 0.

12. A method as claimed in claim 11 wherein x is between 0.05 and 1.0.

13. A method as claimed in claim 10 wherein the composition of (b) is sintered at a temperature below about 2100° C.

14. A method as claimed in claim 11 wherein the material is sintered at a temperature between about 1700° C. and about 1850° C.

* * * * *